United States Patent
Shigeta

(10) Patent No.: US 11,682,260 B2
(45) Date of Patent: Jun. 20, 2023

(54) GAMING CHIP AND METHOD FOR MANUFACTURING THE SAME

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 200 days.

(21) Appl. No.: 17/234,085

(22) Filed: Apr. 19, 2021

(65) Prior Publication Data

US 2021/0327210 A1 Oct. 21, 2021

(30) Foreign Application Priority Data

Apr. 20, 2020 (JP) .............................. JP2020-074504

(51) Int. Cl.
*G07F 17/32* (2006.01)
*B29C 45/14* (2006.01)
*G06K 19/07* (2006.01)

(52) U.S. Cl.
CPC .... *G07F 17/3216* (2013.01); *B29C 45/14065* (2013.01); *G06K 19/0723* (2013.01); *B29C 2045/14131* (2013.01)

(58) Field of Classification Search
CPC .......... G07F 17/3216; B29C 45/14065; B29C 2045/14131; G06K 19/0723
USPC ........................................................ 463/25
See application file for complete search history.

(56) References Cited

U.S. PATENT DOCUMENTS

| 6,021,949 | A | 2/2000 | Boiran |
| 6,659,875 | B2 | 12/2003 | Purton |
| 7,918,455 | B2* | 4/2011 | Chapet ................... A44C 21/00 273/138.2 |
| 7,942,334 | B2* | 5/2011 | Charlier ................. G07F 17/32 235/487 |
| 8,665,094 | B2* | 3/2014 | Lee ....................... G06K 19/047 343/741 |

(Continued)

FOREIGN PATENT DOCUMENTS

| JP | 2000331136 A | 11/2000 |
| JP | 2002007989 A | 1/2002 |

(Continued)

OTHER PUBLICATIONS

The partial European Search Report dated Aug. 23, 2021 issued in EP Application 21169418.7.

(Continued)

*Primary Examiner* — Allen Chan
(74) *Attorney, Agent, or Firm* — Norton Rose Fulbright US LLP

(57) ABSTRACT

A new type of RFID tag is provided. A gaming chip that incorporates a sticker-type RFID tag comprises: an enclosing member having a predetermined shape for enclosing the RFID tag; a body member that is injection-molded to encapsulate the enclosing member with the RFID tag; and a gaming chip for amusement. The enclosing member consists of a first part and a second part, and at least the first part or the second part has a flat surface to which a sticker-type RFID tag can adhere, and the first part and the second part are combined to form an enclosing member, in which the sticker-type RFID tag is covered by the first part and the second part.

17 Claims, 15 Drawing Sheets

(56) References Cited

U.S. PATENT DOCUMENTS

| | | | |
|---|---|---|---|
| 2002/0024439 A1 | 2/2002 | Kawai et al. | |
| 2006/0160628 A1* | 7/2006 | Abe | G06K 19/07327 463/47 |
| 2007/0060304 A1* | 3/2007 | Jeon | G07F 17/3241 463/25 |
| 2007/0197299 A1* | 8/2007 | Miller | A44C 21/00 463/43 |
| 2010/0105486 A1* | 4/2010 | Shigeta | A44C 21/00 463/47 |
| 2010/0130288 A1* | 5/2010 | Shigeta | A44C 21/00 156/60 |
| 2011/0198116 A1 | 8/2011 | Watari et al. | |
| 2011/0253715 A1 | 10/2011 | Phaneuf et al. | |
| 2019/0311997 A1 | 10/2019 | Gaspari et al. | |

FOREIGN PATENT DOCUMENTS

| | | |
|---|---|---|
| JP | 2004021650 A | 1/2004 |
| JP | 2006048498 A | 2/2006 |
| JP | 2006127141 A | 5/2006 |
| JP | 2006172354 A | 6/2006 |
| JP | 2006185254 A | 7/2006 |
| JP | 2008246103 A | 10/2008 |
| JP | 2011170592 A | 9/2011 |
| JP | 2014127102 A | 7/2014 |
| KR | 1020130008289 A | 1/2013 |
| WO | 1996003712 A | 2/2000 |
| WO | 2007100945 A2 | 9/2007 |
| WO | 2008120749 A1 | 10/2008 |

OTHER PUBLICATIONS

Japanese Office Action dated Mar. 15, 2022 issued in JP Application 2021-070200.

International Search Report dated Jun. 22, 2021 issued in PCT Application PCT/JP2021/015931.

* cited by examiner (S41)

(S42)

(S43)

(S44)

GAMING CHIP AND METHOD FOR MANUFACTURING THE SAME

CROSS-REFERENCE OF RELATED APPLICATIONS

This application claims the benefit of priority from JP Pat. App. No. 2020-74504 filed Apr. 20, 2020, the contents of which are hereby incorporated by reference.

TECHNICAL FIELD

The present disclosure relates to a gaming chip with a built-in RFID tag and a manufacturing method thereof.

BACKGROUND

In the past, it has been known that gaming chips have built-in RFID tags as security parts. The RFID tag stores security information such as information for authenticity determination and identification information, and the database stores various information related to the gaming chips associated with this security information. If the RFID tag is removed from the gaming chip with a fraudulent purpose, it can be deciphered and duplicated, adversely affecting security.

FIG. 10 shows a cross-sectional view of a conventional gaming chip. In the example of FIG. 10, an indentation 101 is formed in the center of the gaming chip 100, and a decal member 103 is attached to the indentation. A sticker-type RFID tag 104, which is a security part, is affixed to the back of the decal 103 (e.g., U.S. Pat. No. 6,659,875). In the conventional gaming chip 100, this configuration allows the security part to be built into the gaming chip.

There are also known a gaming chip that incorporate a coil-type RFID tag as a security part. In the case of a coil-type RFID tag, by molding a body member made of resin, for example, so as to enclose the RFID tag, a gaming chip with a built-in the RFID tag.

However, in the conventional gaming chip that incorporates a sticker-type RFID tag, the RFID tag can be removed by peeling off the decal member. Therefore, it is easy to take out the RFID tag in a non-destructive state, and the risk of counterfeiting is relatively high. In addition, in the case of a conventional gaming chip with a built-in sticker-type RFID tag, since the RFID tag is located close to the surface of the gaming chip, there is a relatively high risk that the RFID tag will be damaged in the process of use by external force through the decal member.

In addition, in the conventional gaming chip with a built-in sticker-type RFID tag, since the RFID tag is located close to the surface of the gaming chip, when multiple gaming chips are stacked and multiple RFID tags are read simultaneously, the distance between the multiple RFID tags becomes uneven and the reading of the RFID tags becomes unstable.

On the other hand, coil-type RFID tags can be incorporated in the center of the thickness direction of the gaming chip, so reading when the multiple gaming chips are stacked is relatively stable. Also, since RFID tags can be covered with molding resin, the risk of counterfeiting by removing RFID tags and the risk of damage to RFID tags by use are relatively small. However, in the gaming chips that incorporate a coil-type RFID tag, since the RFID tag is directly covered with molding resin, there is a risk that the RFID tag may be damaged during the manufacturing process of gaming chips with built-in coil-type RFID tags.

The present disclosure solves at least some of the above problems.

SUMMARY

A gaming chip of one aspect of the present disclosure is a gaming chip that incorporates a sticker-type RFID tag, the gaming chip comprising: an enclosing member having a predetermined shape that encloses the RFID tag; a body member that is injection-molded to enclose the enclosing member enclosing the RFID tag; and a decal member that represents a type or denomination of the gaming chip, wherein the enclosing member consists of a first part and a second part, at least the first part or the second part has a flat surface to which the sticker-type RFID tag can be adhered, and the first part and the second part are combined so that the enclosing member is formed and the sticker-type RFID tag is enclosed by the first part and the second part.

With this structure, the sticker-type RFID tag is built into the gaming chip in the state that it is enclosed in the enclosing member. Therefore, it is not easy to remove the RFID tag, and the RFID tag will not be damaged by use. Furthermore, since the RFID tag is enclosed in the enclosing member and the body member is injection-molded around the RFID tag, the possibility of the RFID tag being damaged by manufacturing process can be reduced.

The enclosing member may be covered on entire surface by the injection-molded body member and the decal member. This configuration ensures security because the enclosing member enclosing the RFID tag is not exposed to the surface of the gaming chip.

The enclosing member may be covered on entire surface by the injection-molded body member. This configuration ensures security because the enclosing member enclosing the RFID tag is not exposed to the surface of the gaming chip.

The enclosing member enclosing the RFID tag may be located in the central portion of the gaming chip, and the decal member may be located in the peripheral portion in the thickness direction of the gaming chip. With this configuration, the RFID tag can be located inside the decal member.

The RFID tag may store information about the gaming chip, and may be readable when a plurality of gaming chips are stacked. This configuration allows the plurality of RFID tags of the plurality of gaming chips stacked on the game table or chip tray to be read simultaneously.

The RFID tag may be enclosed within plus or minus 25% of the thickness of the gaming chip from the center of the thickness direction of the gaming chip. This configuration reduces the variation in the distance between a plurality of adjacent RFID tags even when a plurality of gaming chips are stacked, thereby stabilizing the reading of the RFID tags.

The first part and the second part may be combined to form a sealed space for enclosing the RFID tag. This configuration allows a sticker-type RFID tag to be built into the gaming chip, sealed in the sealed space formed by the enclosing member.

The sealed space for enclosing the RFID tag may be configured by press-fitting the first part into the second part. With this configuration, the RFID tag can be easily and reliably enclosed in the enclosing member when manufacturing the gaming chip.

The sealed space for having the RFID tag therein may be configured by engaging the first part and the second part with each other. This configuration also allows the RFID tag to be easily and reliably enclosed in the enclosing member when manufacturing gaming chips.

The sealed space for having the RFID tag therein may be configured by gluing the first part and the second part with each other. This configuration also allows the RFID tag to be easily and reliably enclosed in the enclosing member when manufacturing gaming chips.

The enclosing member enclosing the RFID tag may be configured by sandwiching the RFID tag between the first part and the second part. With this configuration, the RFID tag can be easily enclosed in the enclosing member when manufacturing gaming chips.

The enclosing member enclosing the RFID tag may be configured by sandwiching the RFID tag between the first part and the second part and gluing the first part and the second part. This configuration allows the RFID tag to be securely enclosed in the enclosing member when manufacturing gaming chips.

The first part and the second part may be connected to each other. This configuration facilitates the operation of enclosing the RFID tag in the enclosing member.

The first part and the second part may be connected in a hinged manner. This configuration facilitates the operation of enclosing the RFID tag in the enclosing member.

The diameter of the RFID tag may be larger than the diameter of the decal member. With conventional RFID tags affixed to the back of a decal, the RFID tag cannot be larger than the decal, but by adopting a configuration in which the body member is injection molded to cover the enclosing member that encloses the RFID tag, the size of the RFID tag is not limited by the size of the decal, and can be made sufficiently large.

The specific gravity of the enclosing member may be greater than that of the body member. This configuration allows the gaming chip to be of any weight.

The specific gravity of the enclosing member may be smaller than that of the body member. This configuration allows the gaming chip to be of any weight.

The enclosing member may be configured to be molded into a predetermined shape by injection molding. This configuration allows the enclosing member to be easily manufactured.

A method for manufacturing a gaming chip in one aspect of the present disclosure comprises: a first process of adhering a sticker-type RFID tag to a first part having in advance a flat surface for adhering the sticker-type RFID tag; a second process of covering the first part to which the RFID tag is adhered with a second part to construct an enclosing member that encloses the RFID tag; and a third process of constructing a main body that encloses the enclosing member that encloses the RFID tag by using the enclosing member as an insert part and performing insert molding.

With this configuration, it is possible to manufacture a gaming chip in which a sticker-type RFID tag is built in a state that the sticker-type RFID tag is enclosed in the enclosing member.

A gaming chip in one aspect of the present disclosure is a gaming chip that incorporates an RFID tag, the gaming chips comprising: an enclosing member having a predetermined shape that encloses the RFID tag; a body member that is injection-molded to enclose the enclosing member enclosing the RFID tag; and a decal member representing a type or denomination of the gaming chip, wherein a first part and a second part are combined to form the enclosing member, the RFID tag is covered by the first part and the second part, and the enclosing member is covered by the body member and the decal member around the enclosing member.

With this structure, the RFID tag is built into the gaming chip in the state that it is enclosed in the enclosing member. Therefore, it is not easy to remove the RFID tag, and the RFID tag will not be damaged by use of the gaming chip. In addition, since the RFID tag is enclosed in the enclosing member and the body member is injection-molded around the enclosing member, the possibility of the RFID tag being damaged by this manufacturing process can be reduced.

DESCRIPTION OF EMBODIMENTS

The following is a detailed description of the gaming chip according to the present disclosure with reference to the drawings. In the following, a disc-shaped gaming chip is described as a gaming chip for playing games according to embodiments of the present disclosure, but the present disclosure is not limited by the following embodiments. For example, the shape of the gaming chip may be a rectangular plate or any other shape. Also, the gaming chip may be a plaque. The components in the following embodiments include those that can be easily assumed by those skilled in the art or those that are substantially the same.

Figure 1:
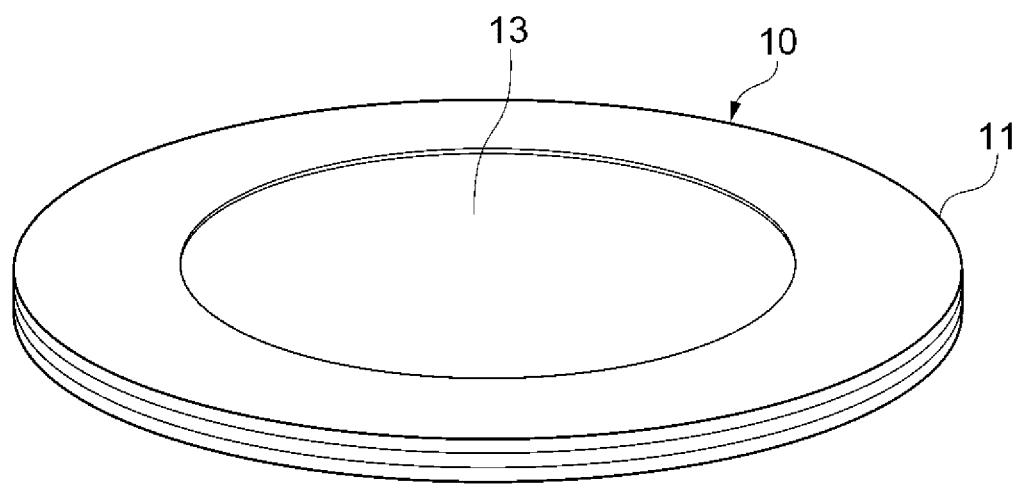
FIG. 1 shows a perspective view of a gaming chip according to the first embodiment of the present disclosure.

FIG. 1 is a diagram of a gaming chip according to the first embodiment of the present disclosure. As shown in FIG. 1, the gaming chip 10 has a disc shape as a whole. The two planes of the disc shape are hereinafter referred to as the plane surface. The gaming chip 10 has a body member having an outer surface that is at least a part of the gaming chip 10, and a decal member 13 located in the center of both plane surfaces of the gaming chip 10. On the plane surface of the gaming chip 10, the body member 11 appears in a donut shape, with the decal member 13 located inside it and the body member 11 located around the decal member 13.

The side surface of the gaming chip 10 consists of the body member 11. The side surface is color-coded in three layers in the thickness direction. The two surface (outer) layers are the same color, and the middle layer is a different color from the two surface layers. As a result, the gaming chip 10 has a striped pattern on its sides whose color changes in the thickness direction.

In addition, the gaming chip 10 has patterns each of those runs from the edge of one plane surface of the body member 11, through the side surface, to the edge of the other plane surface at predetermined angular intervals. As a result, a stripe pattern of varying color in the circumferential direction is formed on the side surface, and a stripe pattern of varying color in the circumferential direction is also formed on the edge of the surface at predetermined intervals. The above-mentioned patterns on the circumferential edges of the plane surface and the side surface of the body member 11 and the colors comprising them represent at least one of the types and denominations (values) of the gaming chips 10.

Figure 2:
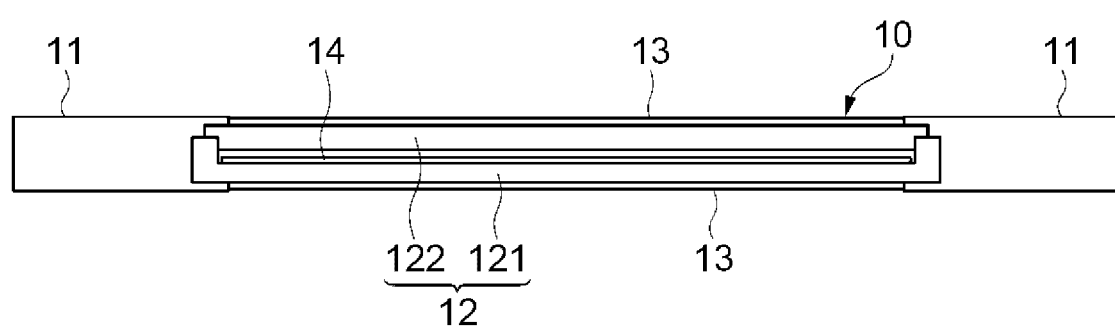
FIG. 2 shows a cross-sectional view of a gaming chip according to the first embodiment of the present disclosure.
Figure 3:
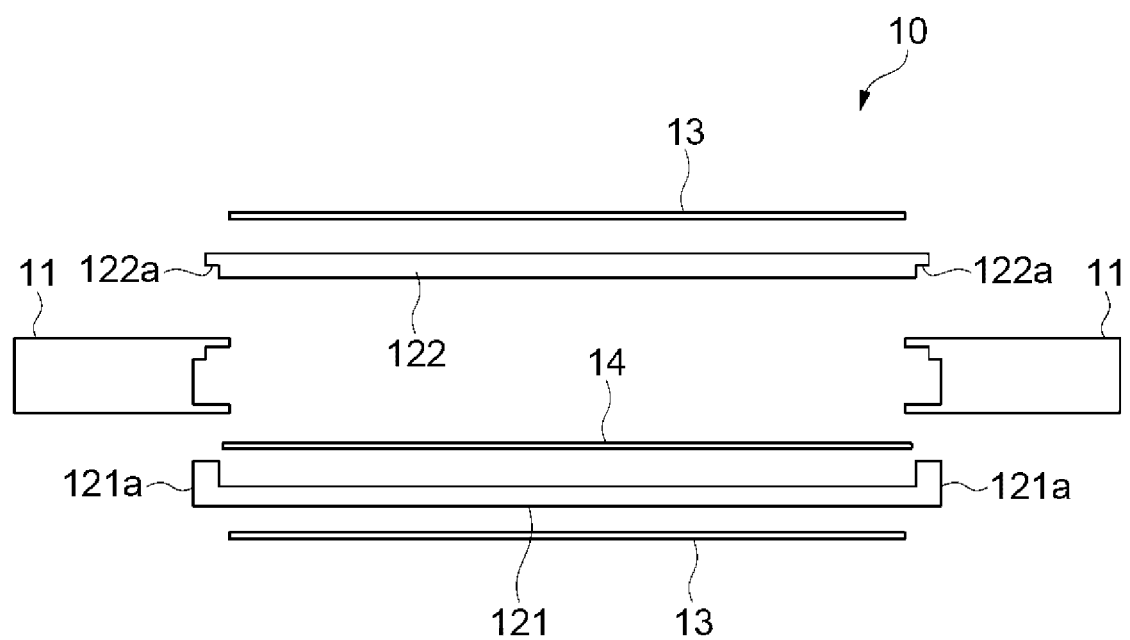
FIG. 3 shows an exploded cross-sectional view of a gaming chip according to the first embodiment of the present disclosure.

FIG. 2 shows a cross-sectional view of the gaming chip according to the first embodiment of the present disclosure, and FIG. 3 shows an exploded cross-sectional view of the gaming chip according to the first embodiment of the present disclosure. As shown in FIGS. 2 and 3, the gaming chip 10 comprises a body member 11, an enclosing member 12, a decal member 13, and an RFID tag 14.

The RFID tag 14 is enclosed in the enclosing member 12. The body member 11 is formed so as to cover the edges of both surfaces of the enclosing member 12 all around. The decal member 13 is placed on the step between the body member 11 and the enclosing member 12. As a result, on the plane surface, the body member 11 and the decal member 13 are substantially in the same plane.

The enclosing member 12 consists of a first part 121 and a second part 122. The first part 121 and the second part 122 are formed by injection molding of resin, respectively. The first part 121 has a circumferential wall 121a at the peripheral edge of the disc shape and is roughly tray-shaped. The inner bottom 121b of the peripheral wall 121a is flat so that the sticker-type RFID tag 14 can adhere to it. The second part is in the shape of a disk and has a flange 122a at the peripheral edge.

The specific gravity of the enclosing member 12 can be greater or smaller than that of the body member 11. Setting the specific gravity of the enclosing member 12 appropriately determines the weight of the gaming chip 10. In other words, once the size (diameter and thickness) of the gaming chip 10 is determined and the material of the body member 11 is determined, the specific gravity of the enclosing member 12 is determined to obtain the weight required for the gaming chip 10. Alternatively, after the size of the gaming chip 10 is determined and the material of the encasing member 12 is determined, the specific gravity of the body member 11 may be determined to obtain the weight required for the gaming chip 10. The specific gravity of the enclosing member 12 and the body member 11 is adjusted by mixing metal powder with those materials.

The RFID tag 14 is a sticker-type RFID tag and is affixed to the flat inner bottom 121b of the first part 121. The first part 121 and the second part 122 are assembled with each other by the second part 122 being press-fitted into the peripheral wall 121a of the first part 121 and the flange 122a of the second part 122 contacting the upper part of the peripheral wall 121a of the first part 121. At this time, a sealed space 12a is formed between the first part 121 and the second part 122 to enclose the RFID tag 14. The contact portions of the first part 121 and the second part 122 are glued together with an adhesive.

The RFID tag 14 is a passive type RFID tag and is excited by electromagnetic waves emitted from an RFID reader to obtain electric power. The RFID reader reads information stored in the RFID tag 14 by electromagnetic waves. The RFID reader can simultaneously read multiple RFID tags 14 embedded in each of multiple stacked gaming chips 10.

The RFID tag 14 stores information about the gaming chip 10. This information at least includes any of identification information (ID) that uniquely identifies the gaming chip 10, the type of gaming chip 10, and the denomination of the gaming chip 10. The information may further include information on history of location or owner.

As described above, the enclosing member 12 is a capsule having a hollow disc shape and enclosing an RFID tag 14 in a sealed space 122a. The RFID tag 14 is sandwiched between the first part 121 and the second part 122, and is covered by the first part 121 and the second part 122. The RFID tag 14 adheres to the flat inner bottom 121b of the first part 121.

The body member 11 is formed by injection molding so as to cover the side surface and edge parts of the plane surfaces of the enclosing member 12 that contains the RFID tag 14 all around. As a result, the body member 11 is formed into a donut-shaped hollow circle, and the enclosing member 12 is enclosed inside it. In other words, the body member 11 is injection molded to enclose the enclosing member 12.

When the body member 11 is formed around the enclosing member 12, a portion of the enclosing member 12 except for the peripheral edge of the enclosing member 12 is exposed inside the surface of the body member 11. A step is formed between the exposed portion 12b of the enclosing member 12 and the circularly shaped surface of the body member 11, and this step forms a circular indentation 12c.

The decal member 13 has roughly the same shape as the indentation 12b, is placed in the indentation 12c, and is affixed to the exposed portion 12b. As a result, the surface of the decal member 13 and the surface of the circular shape of the body member 11 are substantially at the same height.

On the surface of the decal member 13, at least one of the type and denomination of the gaming chip 10 is represented. The back of the decal member 13 is coated with an adhesive, which attaches the decal member 13 to the exposed portion 12b of the enclosing member 12.

As described above, the entire surface of the enclosing member 12 is covered by the body member 11 and the decal member 13, so that the enclosing member 12 is not even partially exposed in the gaming chip 10. Therefore, it is unlikely that the enclosing member 12 will be damaged in the process of use of the gaming chip 10.

The RFID tag 14 is coated with an adhesive on its back side and is attached to the inner bottom 121b of the first part 121 of the enclosing member 12 by this adhesive. The height of the enclosed space formed inside the enclosing member 12 is higher than the thickness of the RFID tag 14. Therefore, when the RFID tag 14 is affixed to the inner bottom 121b of the first part 121, the RFID tag 14 does not contact the inner surface of the second part 122.

On the other hand, the height of the sealed space formed inside the enclosing member 12 is slightly higher than the RFID tag 14. Therefore, if an attempt is made to illegally remove the enclosing member 12 from the body member 11, or if an attempt is made to destroy the enclosing member 12 to remove the RFID tag 14, the RFID tag 14 is likely to be damaged. Thus, it is difficult to remove the RFID tag 14 without damaging it in the present embodiment of gaming chip 10.

As described above, in the gaming chip 10 in the present embodiment, the enclosing member 12 that encloses the RFID tag 14 is located in the center of the thickness direction of the gaming chip 10, and the decal member 13 is located at the periphery of the thickness direction of the gaming chip 10. Therefore, the RFID tag 14 is located at the center of the gaming chip 10 in the thickness direction. Specifically, the RFID tag 14 is located within plus or minus 25% of the center of the thickness direction of the gaming chip 10. Therefore, even if a plurality of gaming chips 10 are stacked on top of each other in any direction, there is no or little variation in the distance between adjacent RFID tags 14, and reading by an RFID reader using electromagnetic waves is stable.

In addition, in the gaming chip 10 in the present embodiment, the size of the RFID tag 14 is not limited by the size of the decal member 13, and the RFID tag 14 can be of a size necessary for reading by an RFID reader. In the present embodiment, the diameter of the RFID tab 14 is larger than the diameter of the decal member 13, as shown in FIG. 2.

Figure 4:
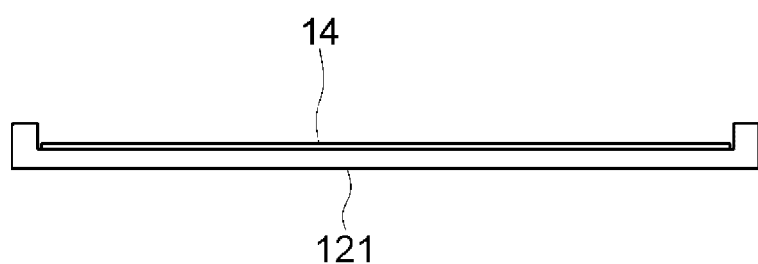
FIG. 4 shows a flowchart of the manufacturing method of the gaming chip according to the first embodiment of the present disclosure.
Figure 4:
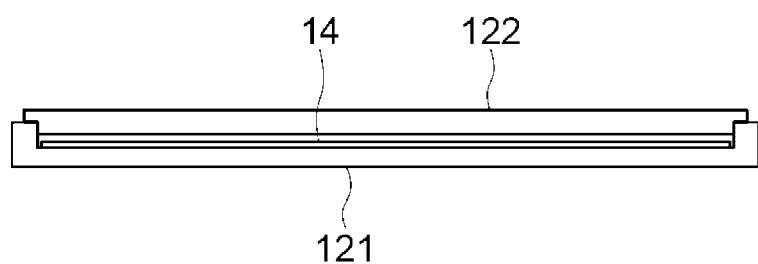
Figure 4:
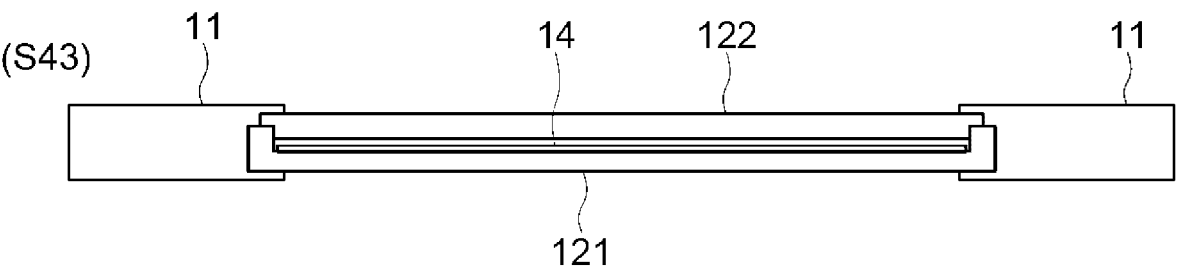
Figure 4:
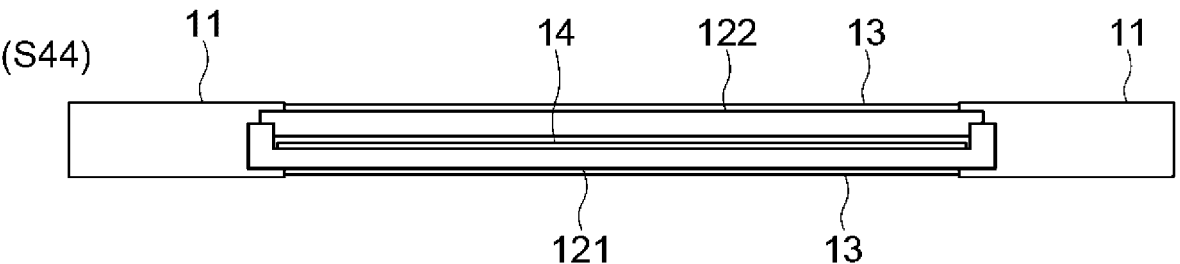

FIG. 4 is a flowchart of a manufacturing method of a gaming chip according to the first embodiment of the present disclosure. In the manufacturing method of the gaming chip 10, first, a first part 121 and a second part 122 comprising the enclosing member 12 are prepared. Then, a sticker-type RFID tag 14 is affixed to the center of the flat inner bottom 121b of the first part 121 (Step S41).

Next, the second part 122 is press-fitted into the first part 121 to which the RFID tag 14 is affixed on the inner bottom 121b, so that the first part 121 and the second part 122 are closed with the RFID tag 14 contained in a sealed space inside (Step S42). The contact portions of the first part 121 and the second part 122 are glued together with an adhesive.

Next, the enclosing member 12 containing the RFID tag 14 is held in the mold as an insert member to constitute the body member 11 by insert injection molding (Step S43). Next, the gaming chip 10 is completed by affixing a decal member 13 to each of the two exposed surfaces 12b of the enclosing member 12 in the structure in which the enclosing member 12 and the body member 11 are integrated (Step S44).

As described above, in the manufacturing method of the gaming chip 10 in the present embodiment, the first part 121 and the second part 122 constituting the enclosing member 12 are each formed in advance so as to form a sealed space for enclosing the RFID tag 14 by being combined. Therefore, the first part 121 and the second part 122 do not deform significantly between the stage of enclosing the RFID tag 14 and the stage when the gaming chip 10 is completed, and the RFID tag 14 is protected by the enclosing member 12 during the manufacturing process of the gaming chip 10 to prevent a large external force from being applied to the RFID tag 14. The RFID tag 14 is protected by the enclosing member 12 during the manufacturing process of the gaming chip 10. Therefore, the possibility of damage to the RFID tag 14 during the manufacturing process can be reduced.

As described above, in the gaming chip 10, the RFID tag 14 is located at approximately the center of the thickness direction of the gaming chip 10. Therefore, when the gaming chip 10 is placed with any side up, the distance from the bottom and top surfaces to the RFID tag 14 is almost uniform.

Figure 5A:
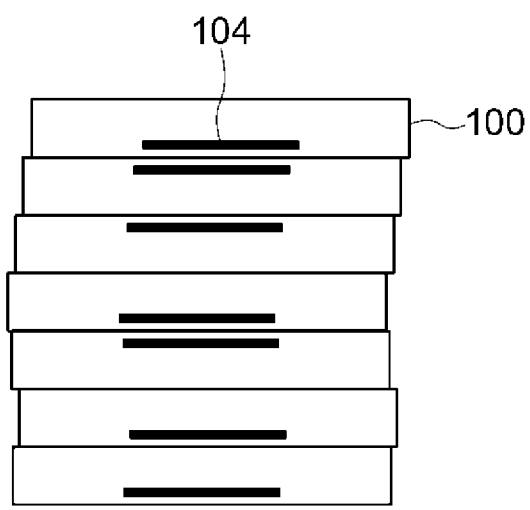
FIG. 5A shows a stack of conventional gaming chips with the RFID tag biased to one side in the thickness direction of the gaming chip.
Figure 5B:
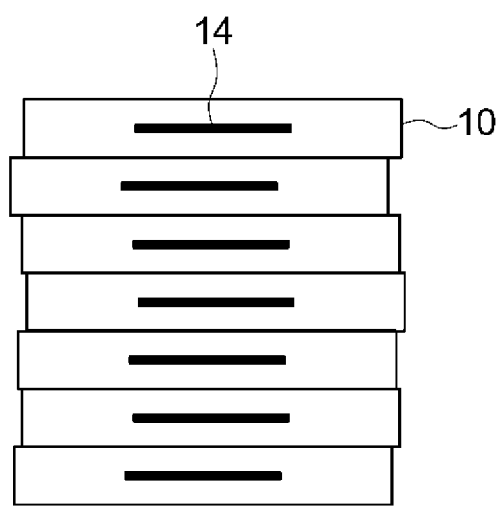
FIG. 5B shows a stack of gaming chips according to the first embodiment of the present disclosure, in which the RFID tags are positioned in the center in the thickness direction of the gaming chips.

FIG. 5A shows a stack of conventional gaming chips in which the RFID tag is disposed unevenly in one direction of the thickness of the gaming chip, and FIG. 5B shows a stack of gaming chips in the present embodiment in which the RFID tag is disposed in the center of the thickness of the gaming chip. In FIGS. 5A and 5B, the gaming chips 100 and 10 are shown schematically, and the dimensional ratio of the gaming chips is shown differently from the above figures for the convenience of explaining the effect of the present embodiment.

As shown in FIG. 5A, in a conventional gaming chip 100, the RFID tags 104 are disposed unevenly on one surface, so that when a plurality of gaming chips 100 are stacked in any direction, the distance between adjacent RFID tags 104 becomes uneven. When multiple RFID tags 104 of multiple gaming chips 100 stacked in such a way are read at the same time in a batch, it has been experimentally found that the reading is not stable.

On the other hand, as shown in FIG. 5B, in the present embodiment of gaming chip 10, the RFID tag 14 is located in the center of the thickness direction of the gaming chip 10, so that even when multiple gaming chips 10 are stacked in any orientation, the distance between adjacent gaming chips 10 is uniform. When multiple RFID tags 14 of a plurality of gaming chips 10 stacked in this way are read simultaneously in a batch, it has been experimentally found that the reading can be performed more stably than in the case of FIG. 5A.

To achieve this effect, the RFID tag 14 is placed within plus or minus 25% from the center of the thickness direction of the gaming chip 10 as described above, and it is more desirable if the RFID tag 14 is placed within plus or minus 10% from the center of the thickness direction of the gaming chip 10. It is more desirable if the RFID tag 14 is located within plus or minus 5% from the center of the thickness direction of the gaming chip 10.

In the above embodiment, the first part 121 and the second part 122 are fixed to each other by the second part 122 being press-fitted into the first part 121, but in addition to or instead of this, the first part 121 and the second part 122 may be fixed to each other by being engaged by one or more engagement claws. In this case, the one or more engagement claws are formed on one of the first part 121 and the second part 122, and one or more engagement recesses each of that engages the engagement claws are formed on the other.

Figure 6:
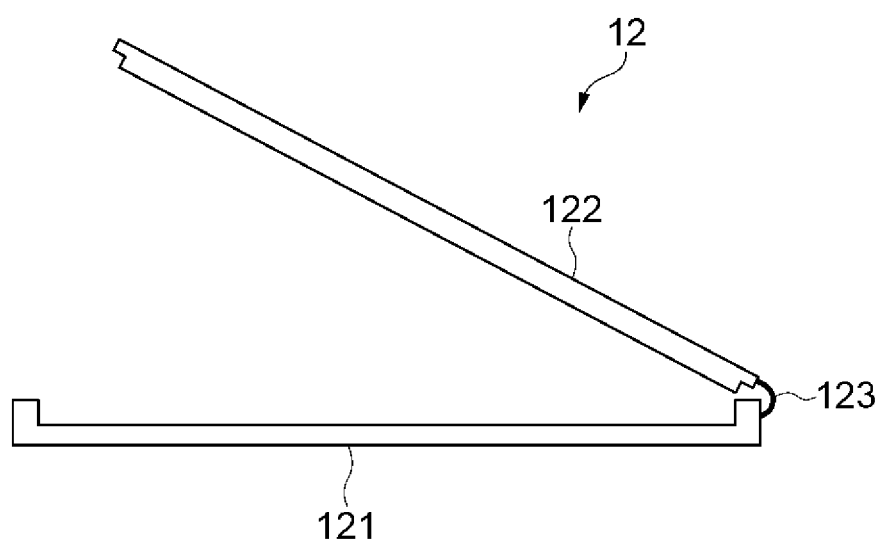
FIG. 6 shows the configuration of the enclosing member according to the second embodiment of the present disclosure.

FIG. 6 shows the configuration of an enclosing member of the second embodiment of the present disclosure. In the example of FIG. 6, the first part 121 and the second part 122 comprising the enclosing member 12 are connected by a connecting piece 123. The connecting piece 123 is flexible, and the angle between the first part 121 and the second part 122 can be arbitrarily changed before the first part 121 and the second part 122 are combined. This configuration also allows the RFID tag 14 to be accommodated in a sealed space by placing the RFID tag 14 between the first part 121 and the second part 122 and fixing the first part 121 and the second part 122 to each other by press fitting or engaging.

The first part 121 and the second part 122 may be connected to each other in a hinged manner. In this case, too, the first part 121 and the second part 122 can be assembled to each other with the RFID tag 14 contained in the sealed space by press-fitting or engaging the first part 121 and the second part 122 by placing the RFID tag 14 between them with the first part 121 and the second part 122 connected.

Figure 7:
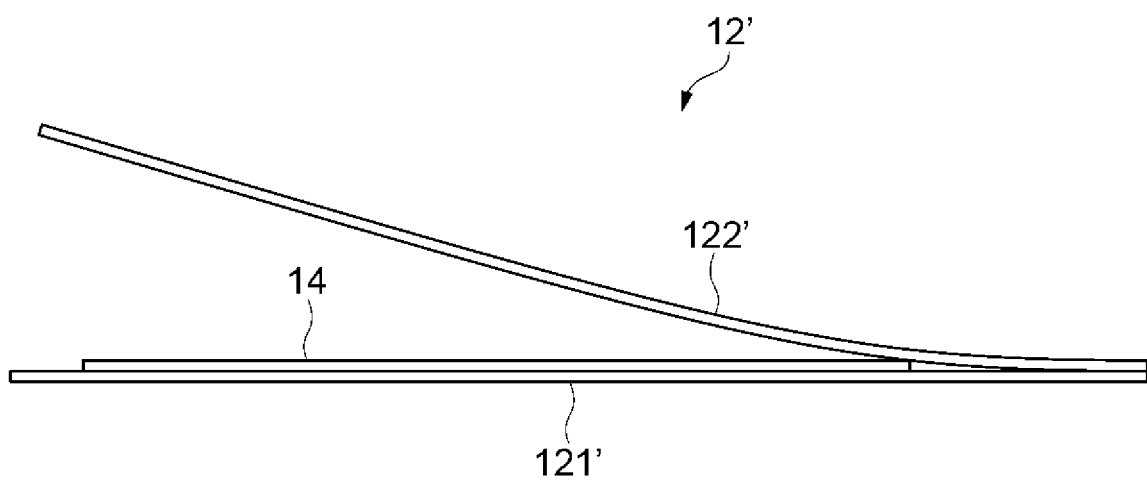
FIG. 7 shows the configuration of the enclosing member according to the third embodiment of the present disclosure.

FIG. 7 shows the configuration of an enclosing member of the third embodiment of the present disclosure. In the example of FIG. 7, the enclosing member 12' consists of a bag-shaped film. That is, the sheet-like first part 121' and the sheet-like second part 122' are partially bonded and partially open. By inserting the RFID tag 14 between the first part 121' and the second part 122' from the open side, the RFID tag 14 can be sandwiched between the first part 121' and the second part 122'. In this example, too, a sealed space is formed between the first part 121' and the second part 122' to accommodate the RFID tag 14, and the RFID tag 14 is protected.

The sheet-like first part 121' and the sheet-like second part 122' may be glued to each other with the RFID tag 14 sandwiched in between. According to this, the RFID tag 14 cannot be removed from the enclosing member 12'. The sheet-like first part 121' and the sheet-like second part 122' may not be connected to each other. In this case also, the first part 121' and the second part 122' may be glued together with the RFID tag 14 sandwiched between the first part 121' and the second part 122'.

Figure 8:
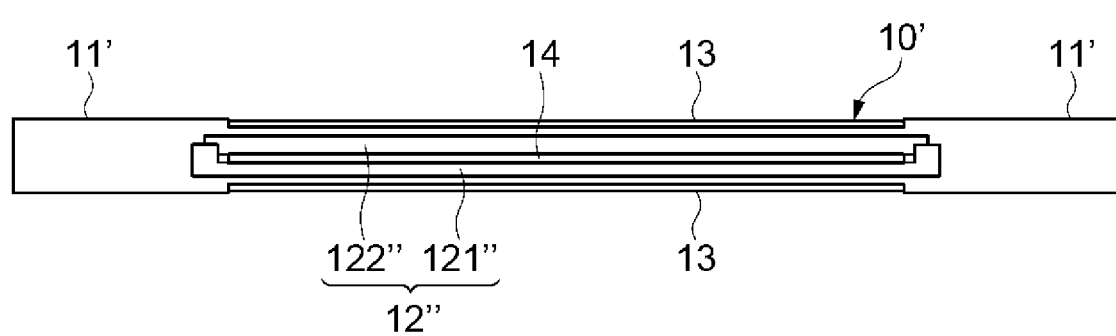
FIG. 8 shows a cross-sectional view of a gaming chip according to the fourth embodiment of the present disclosure.
Figure 9:
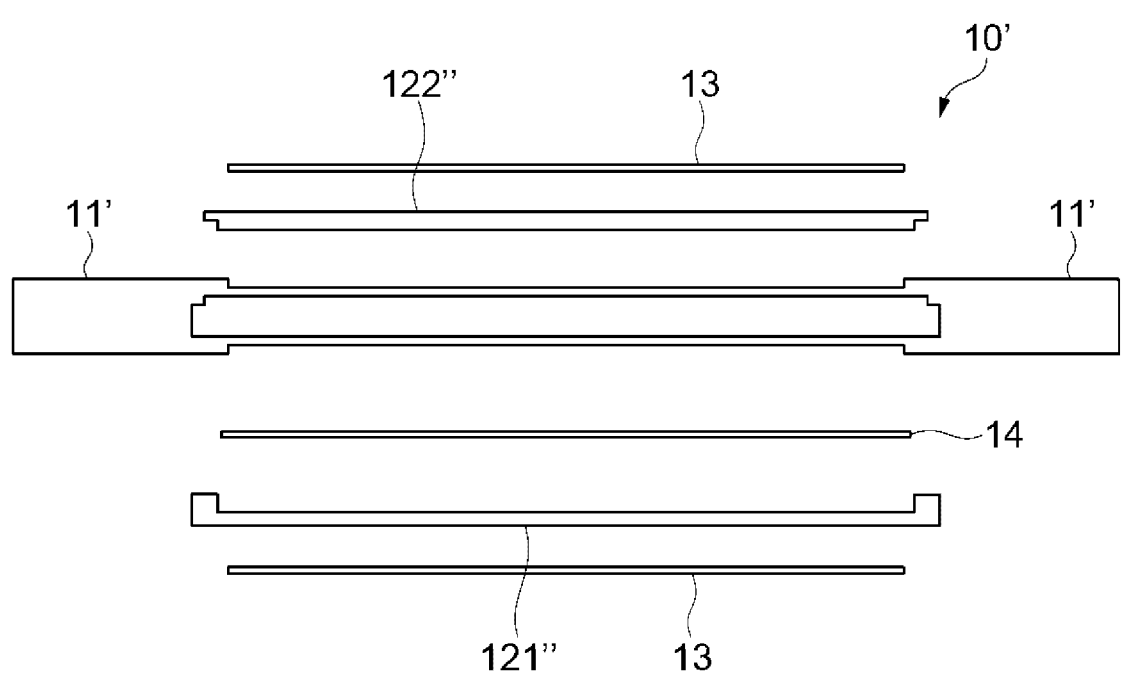
FIG. 9 shows an exploded cross-sectional view of a gaming chip according to the fourth embodiment of the present disclosure.
Figure 10:
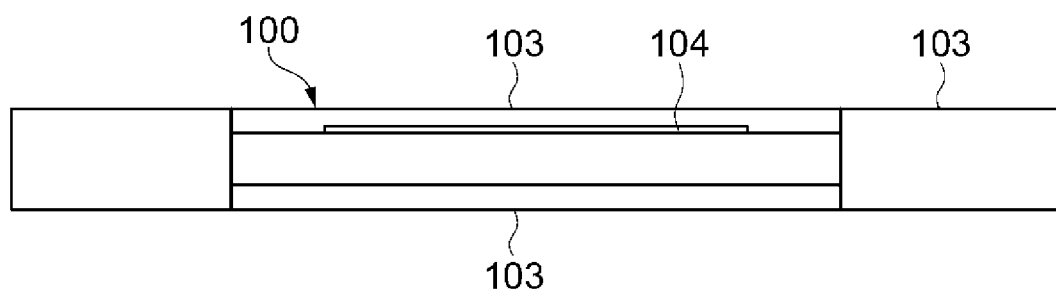
FIG. 10 shows a cross-sectional view of an example of configuration of a conventional gaming chip.

FIG. 8 is a cross-sectional view of a gaming chip according to the fourth embodiment of the present disclosure, and FIG. 9 is an exploded cross-sectional view of the gaming chip according to the fourth embodiment of the present disclosure. The same sign is used for the same configuration as in the first embodiment, and the explanation is omitted. In the gaming chip 10' of the present embodiment, the enclosing member 12" is thinner than the enclosing member 12 of the first embodiment. The body member 11 is injection-molded so as to cover the entire surface of the enclosing member 12", not just the edges.

Specifically, the body member 11 is formed by insert molding the enclosing member 12", which contains the RFID tag 14, as an insert member. At this time, the enclosing member 12" is supported by the support member in the mold. This hole is covered by the decal member 13 and is not exposed in the completed gaming chip 10'.

According to the gaming chip 10' of the present embodiment, the RFID tag 14 is not exposed even if the decal member 13 is removed, because the entire surface of the enclosing member 12' is covered by the body member 11'.

Figure 11:
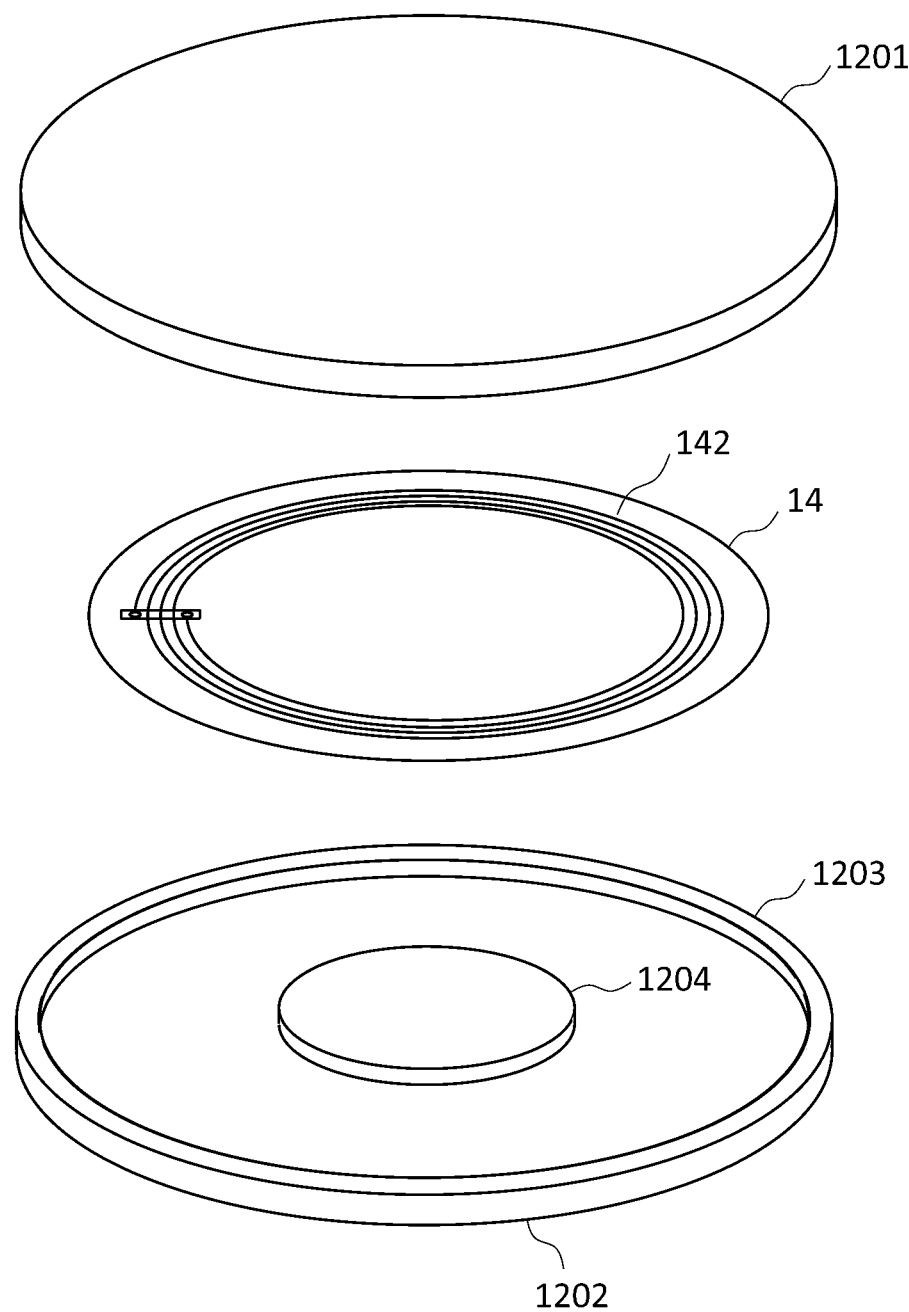
FIG. 11 shows an exploded cross-sectional view of an enclosing member and an RFID tag of a gaming chip according to the fifth embodiment of the present disclosure.

FIG. 11 is an exploded view of an enclosing member and an RFID tag of a gaming chip according to a fifth embodiment of the present disclosure. The enclosing member 120 comprises a first part 1201 and a second part 1202 glued together. The first part 1201 and the second part 1202 are of the same shape, and a bank 1203 is formed at the edge of the disc shape, and a convex portion 1204 on the disc shape is formed in the center of the disc shape. The height of the bank 1203 at the periphery and the height of the convex part 1204 at the center are the same, and the upper surface of each is flat.

Figure 12:
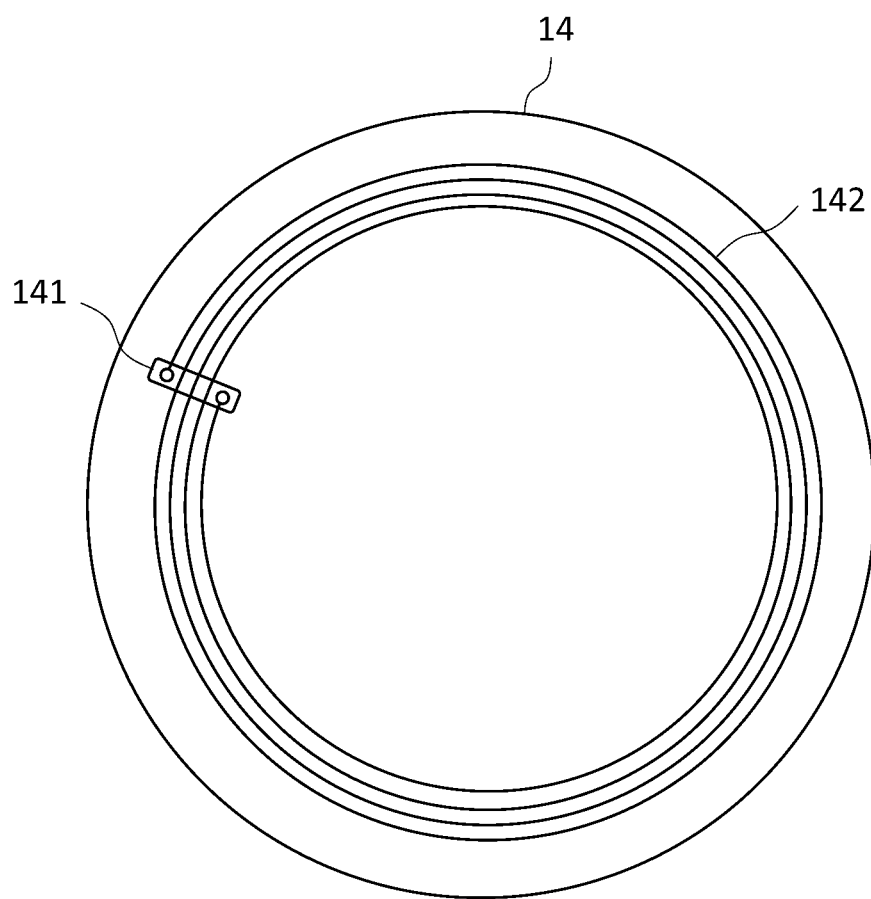
FIG. 12 shows a plan view of an RFID tag according to the fifth embodiment of the present disclosure.

FIG. 12 shows a plan view of an RFID tag of the fifth embodiment of the present disclosure. The RFID tag 14 is of the sticker-type and consists of a circular sheet-shaped film. An adhesive is provided on one side of the film. A circuit 141 is provided at the periphery of the film. An antenna 142 extends from one side of the circuit 141. The antenna 142 extends in a spiral shape along the edge of the film and is connected to the circuit 141. Thus, in the RFID tag 14 of the present embodiment, the antenna 142 is arranged along the periphery, avoiding the center and along the periphery. This makes it possible to receive radio waves over a wider area.

As shown in FIG. 11, the RFID tag 14 is roughly centered with the first part 1201 or the second part 1202, and is glued and fixed to the convex part 1204 of the first part 1201 or the second part 1202 (on which the adhesive surface of the RFID tag 14 faces). At this time, the antenna 142 will be placed avoiding the convex part 1204.

Figure 13:
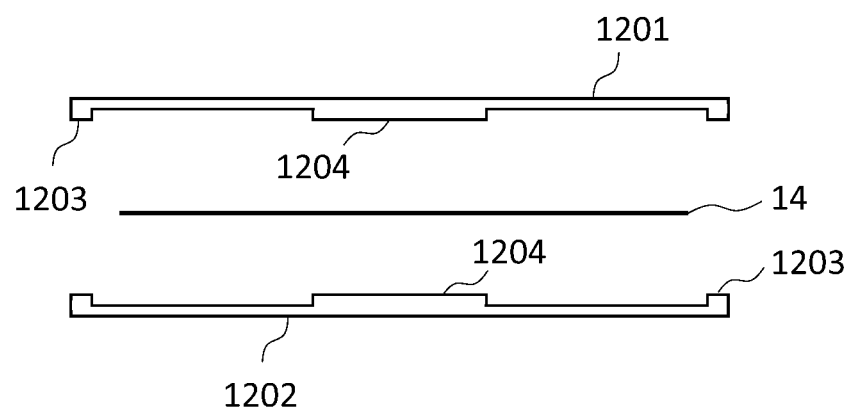
FIG. 13 shows an exploded cross-sectional view of the enclosing member and the RFID tag of the gaming chip according to the fifth embodiment of the present disclosure.

FIG. 13 shows an exploded cross-sectional view of an enclosing member and an RFID tag of a gaming chip according to the fifth embodiment of the present disclosure. As described above, first, the adhesive side of the RFID tag 14 is bonded to the convex part 1204 of either the first part 1201 or the second part 1202, with the centers aligned. Then, the banks 1203 and the convex parts 1204 of the first part 1201 and the second part 1202, respectively, are glued to each other with adhesive. As shown in FIG. 13, since the diameter of the RFID tag 14 is slightly smaller than the inside of the banks 1203 of the first part 1201 and the second part 1202 constituting the enclosing member 120, the RFID tag 14 does not interfere with the banks 1203 of the first part 1201 and the banks 1203 of the second part 1202 even when they are glued together.

In this way, the enclosing member 12 with the RFID tag 14 can be completed, and the circuit and antenna of the RFID tag 14 are not compressed by the first part 1201 and the second part 1202 of the enclosing member 12, and the RFID tag 14 is fixed in the enclosing member 120. The first part 1201 and the second part 1202 are aligned and glued together at the bank 1203 and the convex part 1204 to complete the disc-shaped enclosing member 12.

Figure 14:
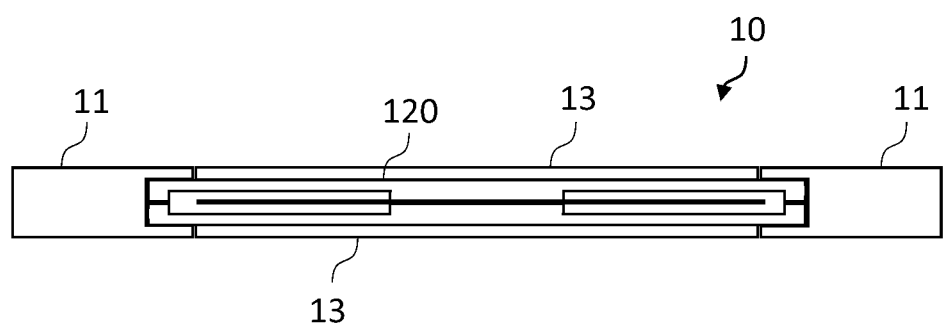
FIG. 14 shows a cross-sectional view of a gaming chip according to the fifth embodiment of the present disclosure.

FIG. 14 shows a cross-sectional view of a gaming chip in accordance with a fifth embodiment of the present disclosure. A body member 11 is provided so as to enclose an enclosing member 12 of a disk shape having an RFID tag 14 enclosed therein. The body member 11 is provided so as to cover the entire circumference of the enclosing member 12 from the side of the enclosing member 12 to the peripheral edges of both planar parts. In the center of the donut-shaped body member 11 holding the enclosing member 12 at the inner edge, the center portion of both planes of the enclosing member 12 is exposed. Just to cover this exposed portion, a decal member 13 is affixed to the enclosing member 12.

As a result, the periphery and sides of the planes of the enclosing member 12 containing the RFID tag 14 are covered by the body member 11, and the remaining portion, i.e., the center portion of both planes, is covered by the decal member 13, so that the RFID tag 12 is built into the gaming chip without any exposed portion. In this way, the periphery and sides of the planes are all covered by the body member 11, so that even when a shock is applied to the gaming chip (for example, when the gaming chip 10 is dropped), the enclosing member 12, and thus the RFID tag 14, is protected from the shock.

The enclosing member 12 and the body member 11 may be made of different materials. The surface of the enclosing member 12 may be marked with information to identify the RFID tag 14 by laser engraving or printing with ink. This allows the RFID tag 14 to be identified by directing the notation to the RFID tag 14, even when the RFID tag 14 has failed and cannot be read.

In the above embodiment, the RFID tag 14 is a sticker-type, but the RFID tag 14 is not limited thereto; for example, it may be a sheet type that does not have an adhesive surface. The RFID tag 14 may also be a coil type. The RFID tag 14 can also be an active type.

In the above embodiment, the gaming chips 10 and 10' are in the shape of a disc, but the shape of the gaming chips is not limited thereto, and may be, for example, in the shape of a rectangular disc.

EXPLANATION OF REFERENCES 10, 10', 10"—Gaming chip
11, 11'—Body member 12, 12'—Enclosing member
121, 121'—First part
122, 122'—Second part
13—Decal member
14—RFID tag

The invention claimed is:

1. A gaming chip that incorporates a sticker-type RFID tag,
an enclosing member having a predetermined shape that encloses the RFID tag;
a body member that is injection-molded to enclose the enclosing member enclosing the RFID tag; and
a decal member that represents a type or denomination of the gaming chip,
wherein:
the enclosing member consists of a first part and a second part,
at least the first part or the second part has a flat surface to which the sticker-type RFID tag can be adhered,
the first part and the second part are combined so that the enclosing member is formed and the sticker-type RFID tag is enclosed by the first part and the second part, and
the RFID tag is enclosed within plus or minus 25% of the thickness of the gaming chip from the center of the thickness direction of the gaming chip.

2. The gaming chip according to claim 1, wherein the enclosing member is covered on entire surface by the injection-molded body member and the decal member.

3. The gaming chip according to claim 1, wherein the enclosing member is covered on entire surface by the injection-molded body member.

4. The gaming chip according to claim 1, wherein:
the enclosing member enclosing the RFID tag is located in the central portion of the gaming chip, and
the decal member is located in the peripheral portion in the thickness direction of the gaming chip.

5. The gaming chip according to claim 1, wherein the RFID tag stores information about the gaming chip, and is readable when a plurality of gaming chips are stacked.

6. The gaming chip according to claim 1, wherein the first part and the second part are combined to form a sealed space for enclosing the RFID tag.

7. The gaming chip according to claim 6, wherein the sealed space for enclosing the RFID tag is configured by press-fitting the first part into the second part.

8. The gaming chip according to claim 6, wherein the sealed space for having the RFID tag therein is configured by engaging the first part and the second part with each other.

9. The gaming chip according to claim 6, wherein the sealed space for having the RFID tag therein is configured by gluing the first part and the second part with each other.

10. The gaming chip according to claim 1, wherein the enclosing member enclosing the RFID tag is configured by sandwiching the RFID tag between the first part and the second part.

11. The gaming chip according to claim 10, wherein the enclosing member enclosing the RFID tag is configured by sandwiching the RFID tag between the first part and the second part and gluing the first part and the second part.

12. The gaming chip according to claim 1, wherein the first part and the second part are connected to each other.

13. The gaming chip according to claim 12, wherein the first part and the second part are connected in a hinged manner.

14. The gaming chip according to claim 1, wherein the diameter of the RFID tag is larger than the diameter of the decal member.

15. The gaming chip according to claim 1, wherein the specific gravity of the enclosing member is greater than that of the body member.

16. The gaming chip according to claim 1, wherein the specific gravity of the enclosing member is smaller than that of the body member.

17. The gaming chip according to claim 1, wherein the enclosing member is configured to be molded into a predetermined shape by injection molding.

* * * * *